US008997071B2

(12) United States Patent
Chen et al.

(10) Patent No.: US 8,997,071 B2
(45) Date of Patent: Mar. 31, 2015

(54) OPTIMIZED DIVISION OF WORK AMONG PROCESSORS IN A HETEROGENEOUS PROCESSING SYSTEM

(75) Inventors: Tong Chen, Yorktown Heights, NY (US); John K. P. O'Brien, South Salem, NY (US); Zehra N. Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/608,043

(22) Filed: Sep. 10, 2012

(65) Prior Publication Data

US 2014/0068582 A1 Mar. 6, 2014

Related U.S. Application Data

(63) Continuation of application No. 13/598,780, filed on Aug. 30, 2012, now abandoned.

(51) Int. Cl.
*G06F 9/45* (2006.01)

(52) U.S. Cl.
CPC ...................................... *G06F 8/451* (2013.01)
USPC ............ 717/149; 717/143; 717/140; 717/107

(58) Field of Classification Search
None
See application file for complete search history.

(56) References Cited

U.S. PATENT DOCUMENTS

| 5,535,393 | A * | 7/1996 | Reeve et al. .................. 717/149 |
| 6,751,791 | B2 * | 6/2004 | Inaba ........................... 717/154 |
| 7,243,333 | B2 * | 7/2007 | Gschwind et al. ............ 717/107 |
| 7,392,511 | B2 * | 6/2008 | Brokenshire et al. ......... 717/143 |
| 7,694,158 | B2 * | 4/2010 | Melpignano et al. ......... 713/300 |
| 7,895,453 | B2 * | 2/2011 | Kasahara et al. ............. 713/300 |
| 8,091,078 | B2 * | 1/2012 | Brokenshire et al. ......... 717/143 |
| 8,296,746 | B2 * | 10/2012 | Takayama et al. ............ 717/149 |
| 2004/0268159 | A1 * | 12/2004 | Aasheim et al. .............. 713/300 |
| 2011/0161636 | A1 * | 6/2011 | Chung et al. .................. 712/220 |
| 2013/0036408 | A1 * | 2/2013 | Auerbach et al. ............. 717/140 |
| 2013/0036409 | A1 * | 2/2013 | Auerbach et al. ............. 717/140 |
| 2014/0068581 | A1 * | 3/2014 | Chen et al. .................... 717/149 |

OTHER PUBLICATIONS

Kafil, Muhammad et al., Optimal Task Assignment in Heterogeneous Distributed Computing Systems, 1998, pp. 42-51.*
Topcuoglu, Haluk et al., Task Scheduling Algorithms for Heterogeneous Processors, 1999, pp. 3-14.*
Ucar, Bora et al., Task Assignment in Heterogeneous Computing Systems, 2005, pp. 32-46.*

(Continued)

*Primary Examiner* — Thuy Dao
*Assistant Examiner* — Christopher Franco
(74) *Attorney, Agent, or Firm* — Cantor Colburn LLP

(57) ABSTRACT

A compiler implemented by a computer performs optimized division of work across heterogeneous processors. The compiler divides source code into code sections and characterizes each of the code sections based on pre-defined criteria. Each of the code sections is characterized as at least one of: allocate to a main processor, allocate to a processing element, allocate to one of a parameterized main processor and a parameterized processing element, and indeterminate. The compiler analyzes side-effects and costs of executing the code sections on allocated processors, and transforms the code sections based on results of the analyzing. The transforming includes re-characterizing the code sections for alternate execution in a runtime environment.

22 Claims, 6 Drawing Sheets

(56) References Cited

OTHER PUBLICATIONS

Shelepov, Daniel et al., Scheduling on Heterogeneous Multicore Processors Using Architectural Signatures , 2008, pp. 1-9.*
Haddad, Emile, Load Distribution Optimization in Heterogeneous Multiple Processor Systems, 1993, pp. 42-47.*
Gonzalez-Velez, Horacio et al., Adaptive Statistical Scheduling of Divisible Workloads in Heterogeneous Systems, 2009, pp. 427-441.*
Augonnet, et al., "StarPU: a unified platform for task scheduling on heterogeneous multicore architectures", University of Bordeaux Concurrency and Computation Practice and Experience, pp. 1-15 (2009).
Becchi, et al., "Dynamic Thread Assignment on Heterogeneous Multiprocessor Architectures", Washington University, Computing Frontiers, pp. 29-39 (2006).
Lilja, "Experiments with a Task Partitioning Model for Heterogeneous Computing", Department of Electrical Engineering, University of Minnesota, pp. 1-7 (1992).
Linderman, et al., "Merge: A Programming Model for Heterogeneous Multi-core Systems", ASPLOS, pp. 1-10 (2008).
Khronos Group, [online]; [retrieved on Jul. 10, 2012]; retrieved from the Internet http://www.khronos.org/opencl/Khronos Group, "Open CL—The open Standard for Parallel Programming of Heterogeneous Systems," pp. 1-3, 2012.
O'Brien, et al., "Supporting OpenMP on Cell", Int J Parallel Prog, pp. 289-311 (2008).
Perez, et al., "CellSs: Making it easier to program the Cell Broadband Engine Processor", IBM J. Res. & Dev., vol. 51 No. 5, pp. 593-604 (2007).
Shelepov, et al., "HASS: A Scheduler for Heterogeneous Multicore Systems", ACM SIGOPS Operating Systems Review, pp. 1-10 (2009).
Song, et al., "A Scalable Framework for Heterogeneous GPU-Based Clusters", SPAA, pp. 1-10 (2012).
Wang, et al., "EXOCHI: Architecture and Programming Environment for a Heterogeneous Multi-core Multithreaded System", PLDI, pp. 156-166 (2007).
Non Final Office Action for U.S. Appl. No. 13/598,780, mailed Jan. 17, 2013, 27 pages.

* cited by examiner

OPTIMIZED DIVISION OF WORK AMONG PROCESSORS IN A HETEROGENEOUS PROCESSING SYSTEM

CROSS-REFERENCE TO RELATED APPLICATION

This application is a continuation of U.S. patent application Ser. No. 13/598,780, filed Aug. 30, 2012, the disclosure of which is incorporated by reference herein in its entirety.

BACKGROUND

The present invention relates generally to computer system management, and more particularly, to optimized division of work in a heterogeneous processing system.

In a heterogeneous processing system, power and performance characteristics differ among the varying types of processors. For example, one or more processors may have higher memory bandwidth than others, and some processors may have higher processing speed capabilities than others. Likewise, some types of tasks that are scheduled on the processing system require different memory bandwidth and processing speeds than other types of tasks. Optimizing code for implementation on heterogeneous processors can present challenges due to the different characteristics of the processors.

SUMMARY

In one embodiment of the invention, a method is provided. The method includes dividing, by a compiler, source code into code sections and characterizing each of the code sections based on pre-defined criteria. Each of the code sections is characterized as one or more of: allocate to a main processor, allocate to a processing element, allocate to one of a parameterized main processor and a parameterized processing element, and indeterminate. The method also includes analyzing side-effects and costs of executing the code sections on allocated processors, and transforming the code sections based on results of the analyzing, the transforming including re-characterizing the code sections for alternate execution in a runtime environment.

In another embodiment of the invention, a computer program product is provided. The computer program product includes a storage medium embodied with computer program instructions, which when executed by a computer processor causes the computer processor to implement a method. The method includes dividing source code into code sections and characterizing each of the code sections based on pre-defined criteria. Each of the code sections is characterized as one or more of: allocate to a main processor, allocate to a processing element, allocate to one of a parameterized main processor and a parameterized processing element, and indeterminate. The method also includes analyzing side-effects and costs of executing the code sections on allocated processors, and transforming the code sections based on results of the analyzing, the transforming including re-characterizing the code sections for alternate execution in a runtime environment.

In a further embodiment of the invention, a method is provided. The method includes dividing, by a compiler, source code into code sections and characterizing each of the code sections based on pre-defined criteria. Each of the code sections is characterized as one or more of: allocate to a main processor, allocate to a processing element, allocate to one of a parameterized main processor and a parameterized processing element, and indeterminate. A parameter used in the characterizing includes a constraint imposed by a power budget for an active memory system. The method also includes analyzing side-effects and costs of executing the code sections on allocated processors. The side-effects include the constraint. The method further includes transforming the code sections based on results of the analyzing. The transforming includes re-characterizing the code sections for alternate execution in a runtime environment.

In yet a further embodiment of the invention, a computer program product is provided. The computer program product includes a storage medium embodied with computer program instructions, which when executed by a computer processor causes the computer processor to implement a method. The method includes dividing, by a compiler, source code into code sections and characterizing each of the code sections based on pre-defined criteria. Each of the code sections is characterized as one or more of: allocate to a main processor, allocate to a processing element, allocate to one of a parameterized main processor and a parameterized processing element, and indeterminate. A parameter used in the characterizing includes a constraint imposed by a power budget for an active memory system. The method also includes analyzing side-effects and costs of executing the code sections on allocated processors. The side-effects include the constraint. The method further includes transforming the code sections based on results of the analyzing. The transforming includes re-characterizing the code sections for alternate execution in a runtime environment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, compiler-optimized division of work in a heterogeneous processing system (also referred to herein as "optimized division of work") is provided. The optimized division of work process evaluates code using various criteria and determines which processors in the heterogeneous processing system to assign selections of the code for execution, such that optimal power and performance efficiency are realized. Utilizing a performance model (e.g., static model), the optimized division of work process, in the selection process, takes into account memory and performance characteristics intrinsic to a portion of code, as well as constraints on the overall system resources, such as availability of processors and the power budget.

Figure 1:
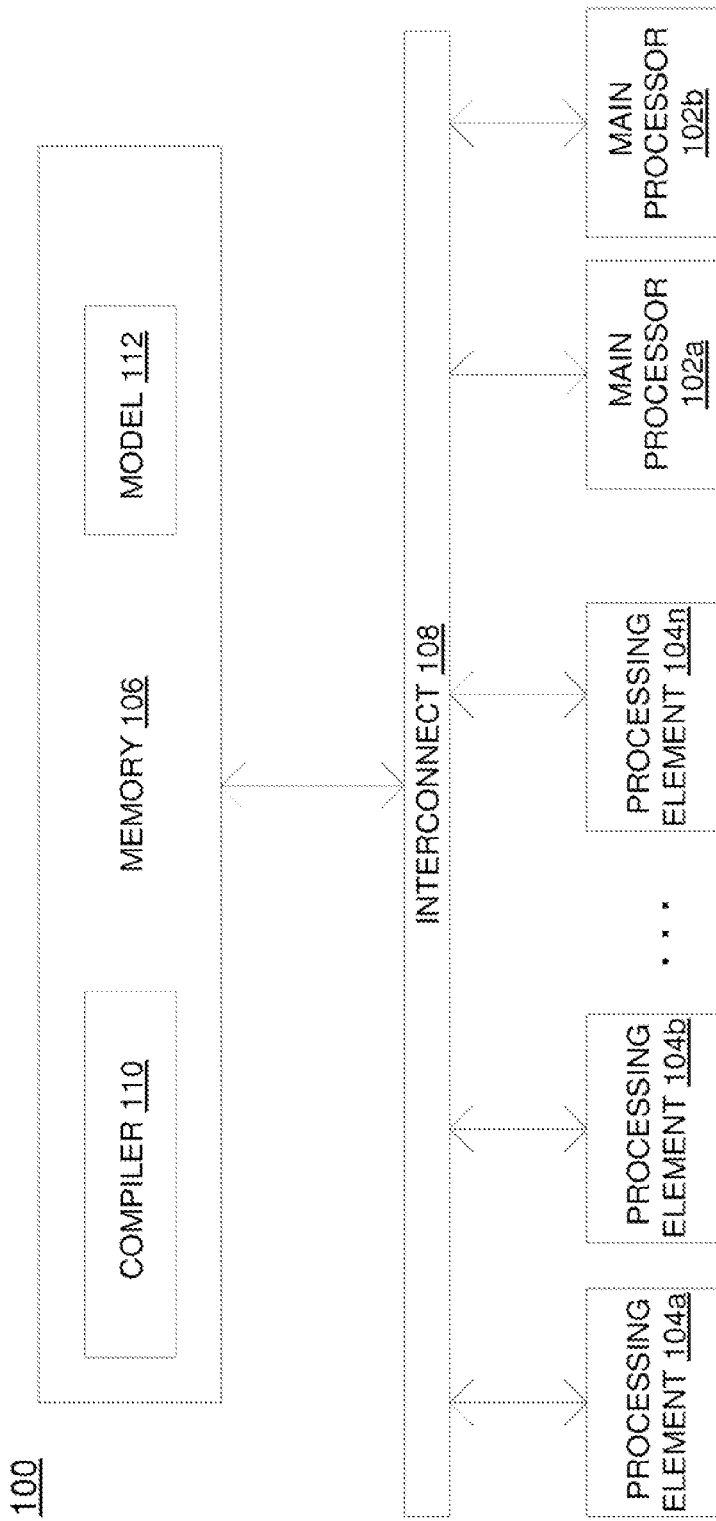
FIG. 1 illustrates a schematic diagram of a system for implementing optimized division of work in accordance with an embodiment.

Turning now to FIG. 1, a system 100 upon which the optimized division of work processes may be implemented will now be described in an embodiment. The system 100 includes main processors 102a-102b, processing elements 104a-104n, and a memory system 106 communicatively coupled to an interconnect network 108.

The main processors 102a-102b and the processing elements 104a-104n are implemented as hardware devices for executing software and include heterogeneous computer processors having different performance and physical characteristics. For example, the main processors 102a-102b may be high-performance general-purpose processors, and the processing elements 104a-104n may be virtually any custom made or commercially available processors, central processing units (CPUs), data signal processors (DSP), or auxiliary processors. In an embodiment described in FIG. 5, the processing elements 104a-104n form part of an active memory system. When described collectively, the main processors and the processing elements are referred to herein as "processors."

The interconnect network 108 may be, for example, but is not limited to, one or more buses or other wired or wireless connections, as is known in the art. The interconnect network 108 may have additional elements, such as controllers, buffers (caches), drivers, repeaters, and receivers, to enable communications. Further, the interconnect network 108 may include address, control, and/or data connections to enable appropriate communications among the aforementioned components.

The memory system 106 is implemented as a computer readable memory and may include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory system 106 may incorporate electronic, magnetic, optical, and/or other types of storage media. It will be understood that the memory system 106 may have a distributed architecture, where various components are situated remote from one another, but can be accessed by the main processors 102a-102b and the processing elements 104a-104n.

The memory system 106 may store one or more separate programs, each of which comprises an ordered listing of executable instructions for implementing logical functions. For example, software stored in the memory system 106 may include an operating system (not shown), source code (not shown), and one or more applications. As shown in FIG. 1, the memory system 106 stores a compiler 110 and a performance model 112. The compiler 110 may alternatively be stored and executed on a system that is external to the system 100 for which it produces executable programs. The compiler 110 includes numerous functional components for implementing the features, processes, methods, functions, and operations of the exemplary embodiments, as will be described further herein. Optimized code is executed in a runtime environment (not shown) of the system 100.

The applications may include a source program, executable program (object code), script, or any other entity comprising a set of instructions to be performed. When the application is a source program, the program is translated via the compiler 110.

The performance model 112 correlates performance information with optimization parameters. The model 112 may be established by taking into account the characteristics of the system 100. The model 112 may also be established by running program simulations and determining probable outcomes of various code sections or features. The performance model 112 enables the compiler 110 to predict program performance for various configurations.

When the system 100 is in operation, the main processor 102 and the processing elements 104a-104n are configured to execute software stored within the memory system 106, to communicate data to and from the memory system 106, and to generally control operations of the system 100 pursuant to the software.

While only two main processors 102a-102b are shown in FIG. 1 for convenience of illustration, it will be understood that any number of main processors may be employed by the system 100 in order to realize the advantages of the embodiments described herein.

Figure 2:
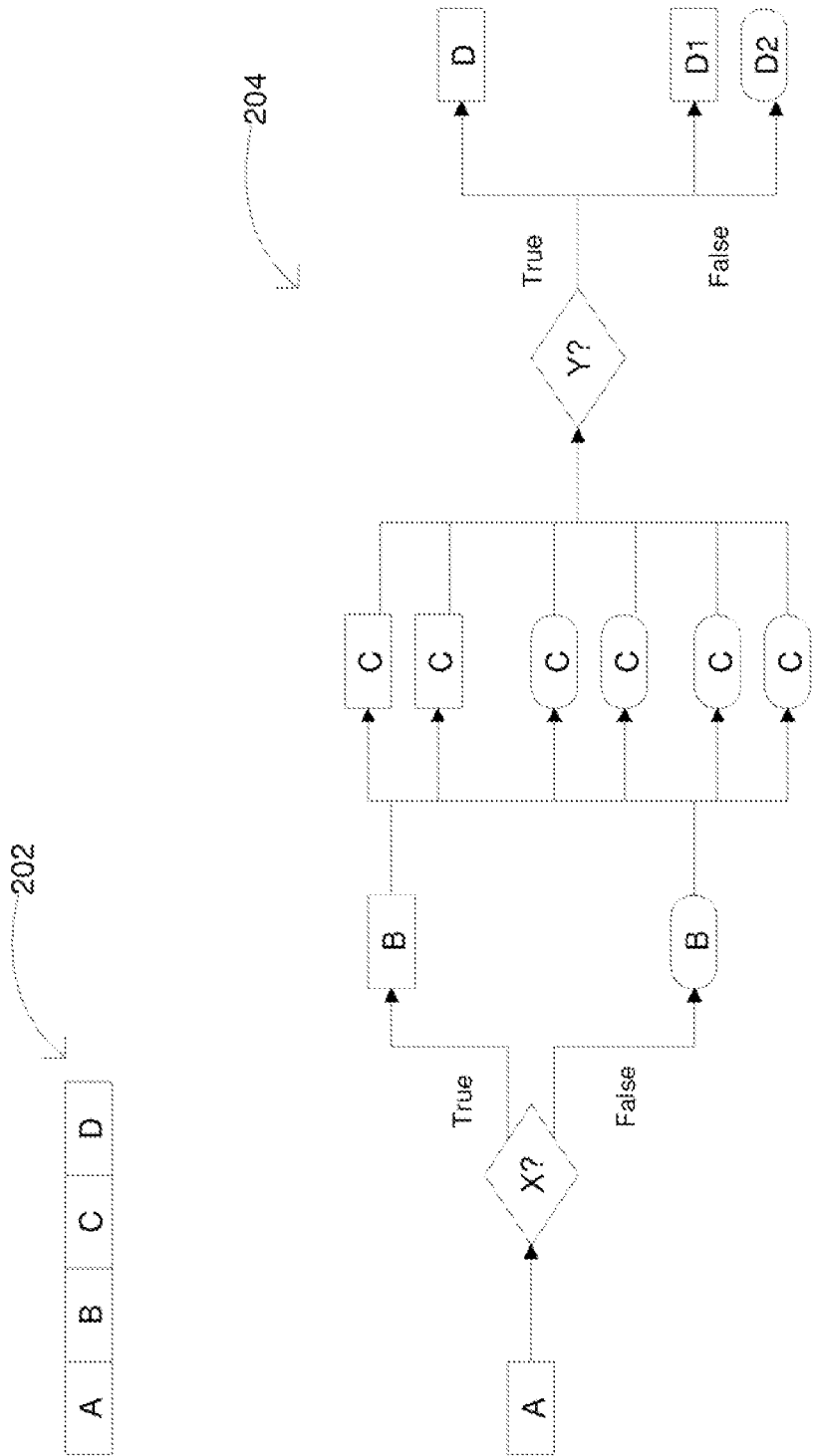
FIG. 2 illustrates a diagram of a sample input code sections and optimized code that is output resulting from implementation of the optimized division of work in accordance with an embodiment.

Turning now to FIG. 2, a sample input thread 202 of code sections and output 204 resulting from implementation of the optimized division of work processes will now be described. The output 204 shown in FIG. 2 represents parallel code targeting multiple heterogeneous processors (e.g., main processors 102a-102b and processing elements 104a-104n) that is optimized for system performance and energy, and is constrained by maximum power limits of the system.

The input thread 202 includes code sections A, B, C, and D, and the output 204 represents a scheme of how the runtime environment will execute these code sections as determined by the analysis performed by the compiler 110. For purposes of illustration, in the output 204 of FIG. 2, the code sections in rectangular boxes reflect that the instructions have been designated or allocated for execution on one of the main processors 102a-102b, while the code sections in rounded shapes reflect that the instructions have been allocated for execution on one or more of the processing elements 104a-104n.

In operation, the compiler 110 begins with the first code section (code section A) and anticipates (e.g., using the model 112) whether, at completion of its execution, a condition is met. As shown in FIG. 2, a parameter or predicate 'x' is evaluated. For example, in one embodiment, the condition is a True/False condition and the parameter evaluated is whether resources are available. Another parameter may be whether a particular instruction has completed at a point in time. As shown in FIG. 2, if the evaluation results in True, the compiler 110 allocates the next code section (e.g., code section B) in the thread 202 to one of the main processors 102a-102b for execution. Otherwise, if the result of the evaluation of 'x' is False, the compiler 110 allocates the execution of the code section B to one of the processing elements 104a-104n.

As shown in FIG. 2, the compiler 110 then distributively allocates the code section C among multiple processing elements 104a-104n for parallel processing. As shown in FIG. 2 for purposes of illustration, two portions of code section C are assigned to the respective main processors 102a-102b and portions of the code section C are allocated among four of the processing elements 104a-104n. The code section C may be, e.g., a process stream or matrix of data that can be subdivided among processors.

The compiler 110 looks at the output of code section C and anticipates whether, at completion of its execution, a condition is met. As shown in FIG. 2, a parameter 'y' is evaluated. If the condition is true, the compiler 110 allocates the execution of the code section D to one of the main processors 102a-102b. Otherwise, if the condition is False, the compiler 110 allocates a portion of the execution of the code section D to one of the main processors 102a-102 and another portion to one of the processing elements 104a-104n. For example, the condition 'y' may be an if-then-else statement.

The scheme of execution depicted in FIG. 2 represents one non-limiting example of optimization. It will be understood that multiple variations of schemes may be developed by the optimized division of work processes based on various criteria, which is described further in FIG. 3.

Figure 3:
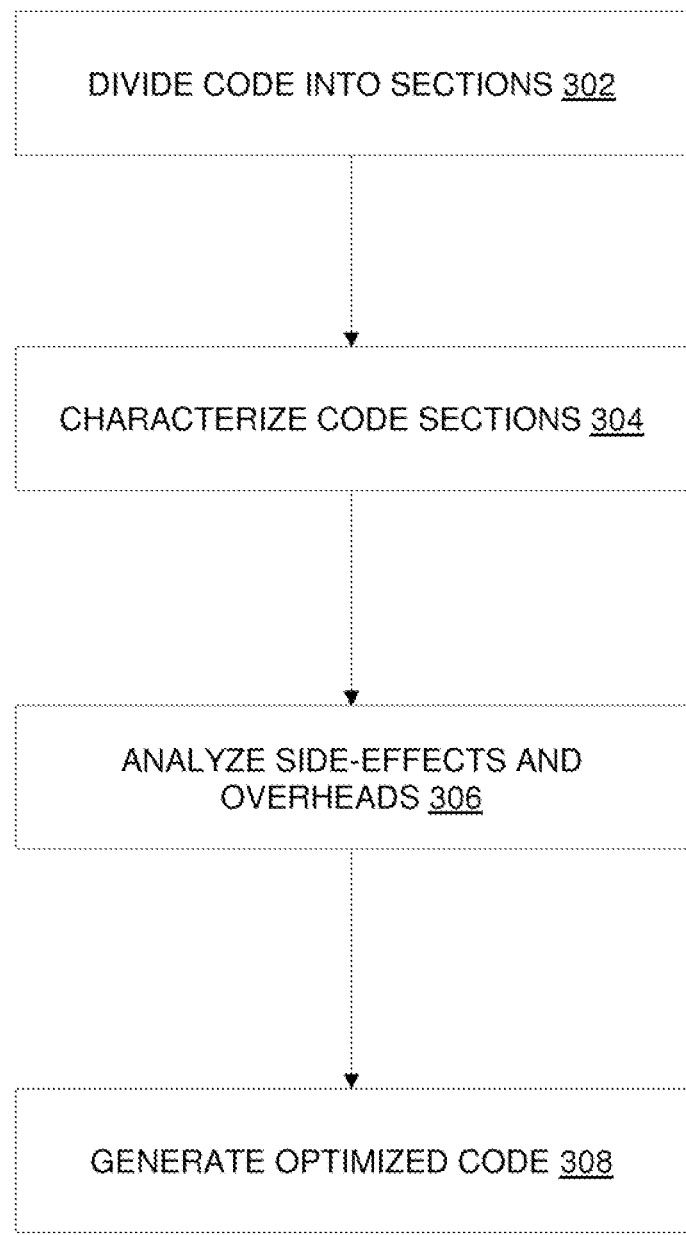
FIG. 3 illustrates a flow diagram of a method for optimizing code in accordance with an embodiment.

Turning now to FIG. 3, a flow diagram illustrating a process for optimizing code (e.g., source code) via the compiler 110 will now be described in an embodiment.

At block 302, the compiler 110 divides the code into sections. Various criteria may be used to determine how to partition the code into sections. For example, in one embodiment, a program developer or other user of the system 100 may configure the code sections directly through the compiler 110 (e.g., using directives). In addition, or alternatively, the program structure of the source code may be used to determine where to partition the code into sections. For example, program functions, loops, basic blocks, call graph connected components, etc. may be elements used in the determination. Other criteria, such as code semantics, data dependencies, code size of a section, and/or profiling data may be used.

At step 304, the compiler 110 characterizes the code sections based on evaluations performed for the code sections using various criteria. In an embodiment, the code sections are evaluated using one or more of: number of compute operations, memory access patterns, amount of bandwidth required, function calls, branches, size of the sections, profiling data, user input, vector parallelism, SIMD parallelism, fine-grain parallelism, and synchronization needs, to name a few. The compiler 110 uses these characterizations to preliminarily determine where to execute these code sections. In an embodiment, the result of the characterizations may be the allocation or assignment of a code section to a processing element, or to a main processor, or to a parameterized processing element or main processor. Alternatively, one result of the characterization may be the indication 'indeterminate.' The 'indeterminate' characterization indicates the evaluation resulted in no clear decision on which processor is best for executing a code section. In this instance, the compiler 110 may let the runtime code determine where to allocate the code section based on dynamic power or performance considerations. A parameterized processing element or main processor characterization reflects that the decision or allocation is based on results of the evaluation of a condition. For example, in FIG. 2, the evaluation of 'x' as True results in the parameterized allocation of code section B to a main processor, while the evaluation of 'x' as False results in the parameterized allocation of code section B to a processing element.

At block 306, the compiler 110 analyzes side-effects and overheads associated with implementing the code sections on the processors to which the code sections have been allocated. In an embodiment, this analysis considers costs due to placing successive code sections on different processing elements (e.g., lost opportunities associated with memory re-use or code transformations, as well as costs associated with processing element start-ups and any extra data transfers required). This analysis may also consider the side effects of concurrent execution of a code section on the main processors 102a-102b and processing elements 104a-104n in terms of resource availability, maximum power constraints, data layout, and/or synchronization optimization. Based on the analyses performed in block 306 for any given code section, the compiler 110 may re-characterize code sections for alternate executions of a previous (or next) code section.

At block 308, the compiler 110 generates optimized code using results of the side-effects and overhead analyses. In an embodiment, the compiler 110 optimizes the code sections for architecture-specific transformations, parallelism, and code versioning. The parallelism optimization accounts for SIMD/vector processing, data parallelism, task parallelism (e.g., across main and processing elements), and fine-grained parallelism (e.g., for processing element slices and multi-threading). The code versioning accounts for heterogeneity of the system, power criteria, utilization of multiple processing elements, and fine-grained parallelism.

Figure 4:
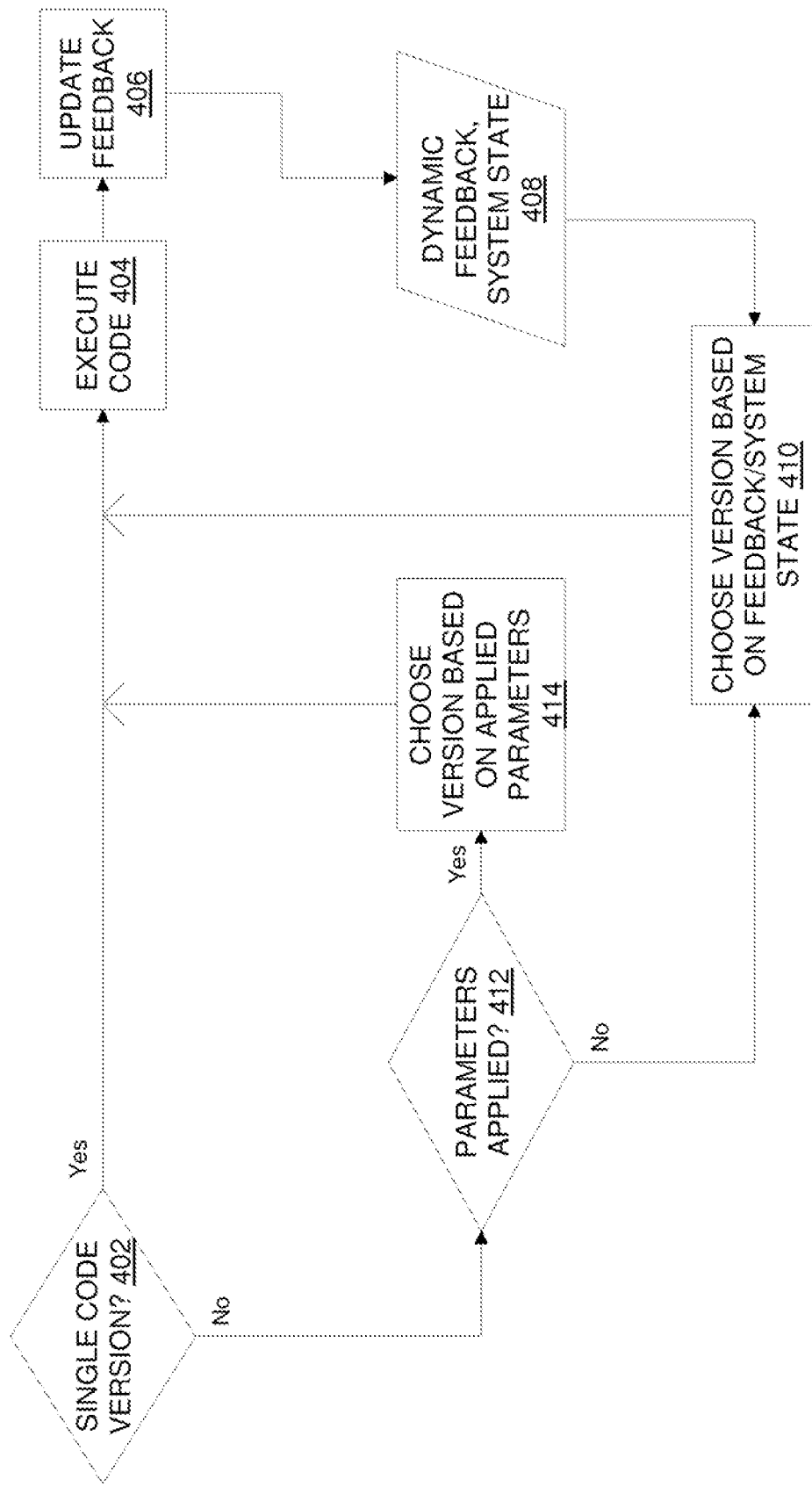
FIG. 4 illustrates a flow diagram for executing an optimized code section in accordance with an embodiment.

Turning now to FIG. 4, a flow diagram describing a process for executing the optimized compiled code (e.g., results of the process performed in FIG. 3) will now be described in an embodiment.

At block 402, the runtime environment determines if there is a single code version or multiple code versions for a code section. When executed, each version of the same code section results in the same functionality, and only one version needs to be executed. However, different code versions use different sequences of instructions to arrive at the same result, and therefore they have different performance characteristics. The compiler 110 may generate multiple versions for a code section, with each version optimized for a specific set of performance characteristics. For example, there may be one version that executes fastest on the main processor 102, another version that executes fastest on a processing element 104, yet another version that minimizes power consumption while sacrificing speed of execution, and yet another version that exploits the maximum amount of parallelism.

If there is a single code version at block 402, the assigned processing element executes the code section at block 404 and provides feedback regarding the execution. The feedback includes statistics on performance and resource utilization, e.g. speed of execution, power consumption, bandwidth used, frequency of memory delays, etc. This feedback is recorded in block 406, and is used to update the information stored in block 408. Note that block 408 represents a data block that stores and provides dynamic feedback information. The information in block 408 also includes the current state of the system, such as available resources, and power constraints. The information in block 408 is used by the runtime environment when it needs to dynamically select a code version in block 410. The information in block 408 may also be used by the compiler 110 to refine its optimization strategy.

Returning to block 402, if there is more than one version of the code, the runtime environment determines if parameters have been applied at block 412 (e.g., the 'x' and 'y' parameters illustrated in FIG. 2). If so, the runtime environment evaluates the parameters in block 414, and accordingly selects the correct version, and the process proceeds to block 404. The selection in block 414 is done based on the execution scheme produced by the compiler 110, an example of which is illustrated in FIG. 2. Otherwise, if no parameters are applied at block 412, this means the code characteristics are indeterminate. The processing element selects the best version at block 410 using data provided by block 408. The best version may be determined based on information regarding resource availability, power constraints, and profitability. For example, the best version may be the one determined to most closely match the current system state.

Figure 5:
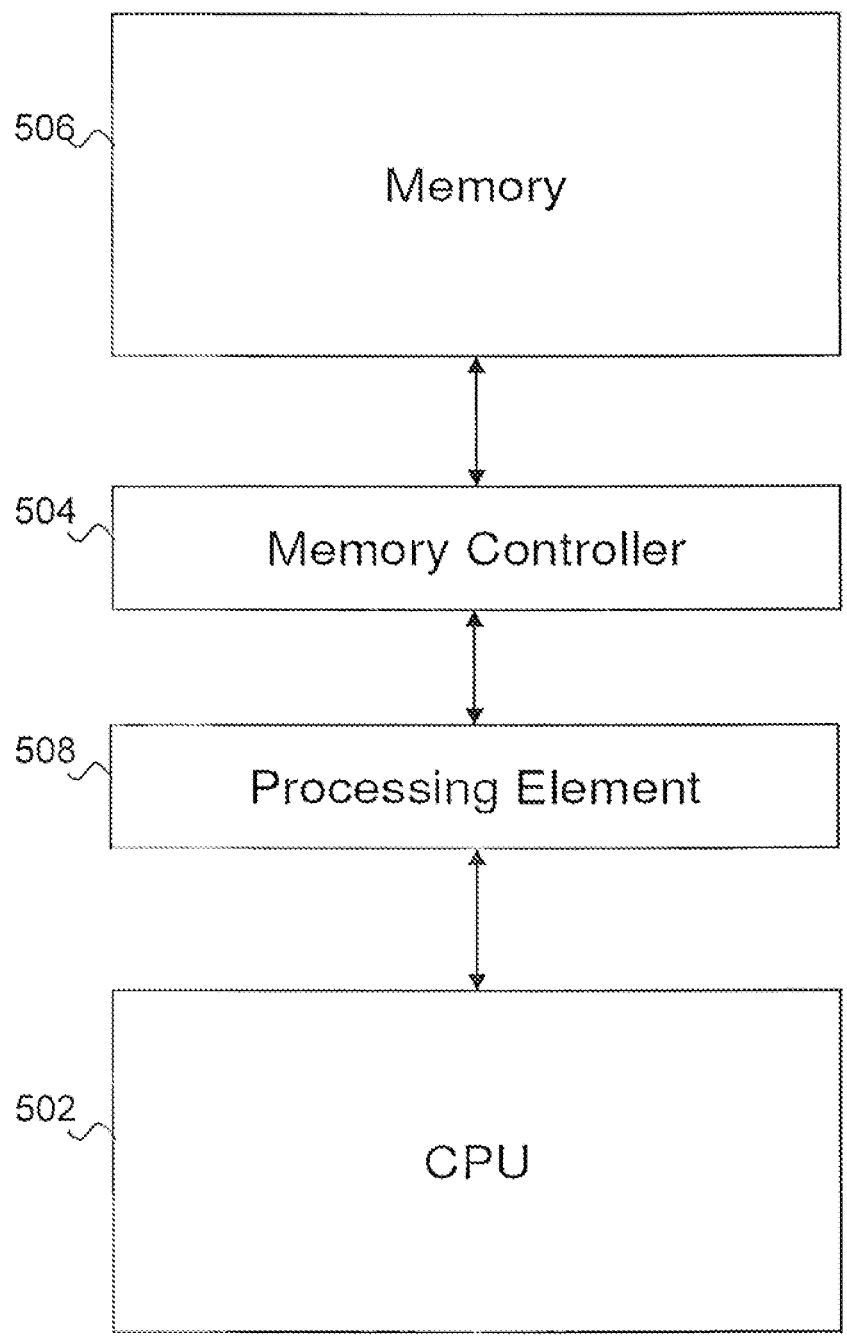
FIG. 5 illustrates a block diagram of a system for active memory utilized in implementing the optimized division of work in accordance with an embodiment.
Figure 6:
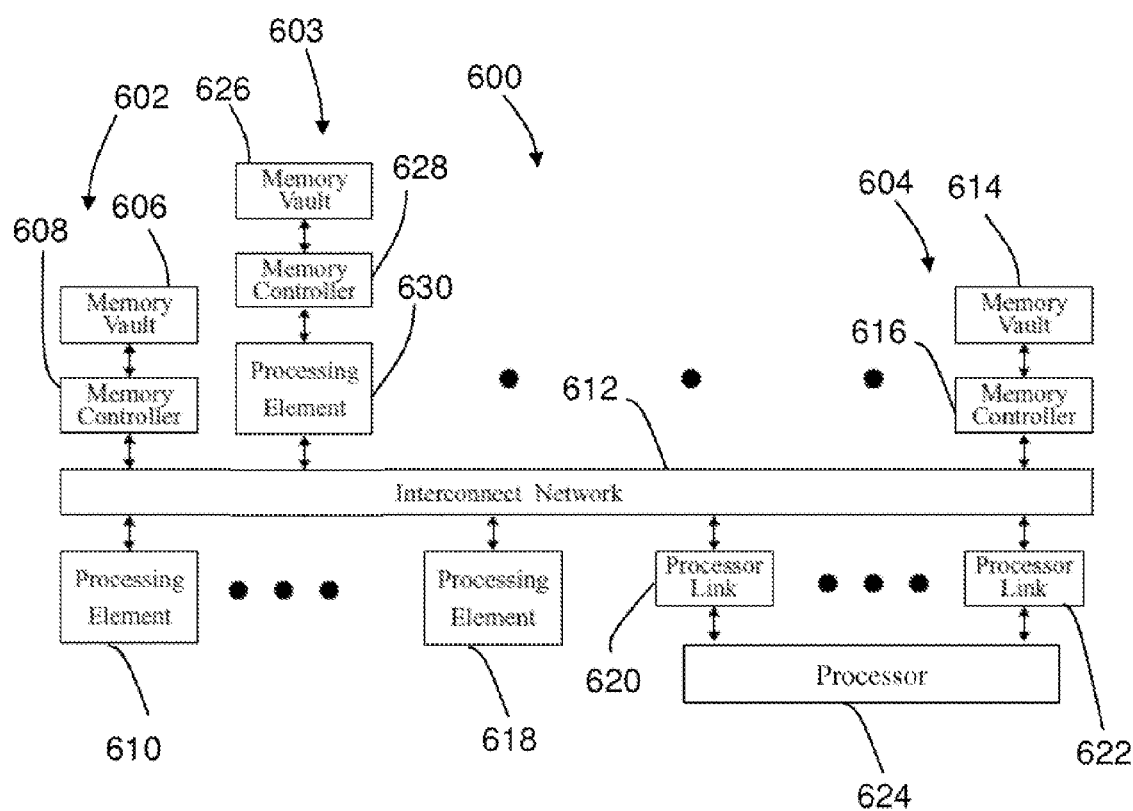
FIG. 6 illustrates a block diagram of a memory system with active memory utilized in implementing the optimized division of work in accordance with an embodiment.

As indicated above, the processing elements 104*a*-104*n* may form part of an active memory system. FIG. 5 illustrates a block diagram of a system with active memory upon which the optimized division of work process may be implemented, and FIG. 6 illustrates a block diagram of a memory system with active memory upon which the optimized division of work process may be implemented.

The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 5 illustrates a block diagram of a system for storing and retrieving data in a memory in accordance with an embodiment. A system 500 depicted in FIG. 5 includes a computer processor (CPU) 502, a memory 506 having memory devices, as well as a memory controller 504 and processing element 508 for receiving and processing data from the computer processor 502 to be stored in the memory 506.

The memory controller 504 may be in communication with the computer processor 502 and receive write requests from the computer processor 502 without using functions of the processing element 508. The write requests contain data to be written to the memory 506 and a real address for identifying the location in the memory 506 to which the data will be written. The memory controller 504 stores data at a real address within the memory 506. The computer processor 502 can map the virtual address to a real address in the memory 506 when storing or retrieving data. The real address for a given virtual address may change each time data in the memory 506 is modified.

In an embodiment, the processing element 508 is in communication with the computer processor 502 and receives a command from the computer processor 502. The command may correspond to instructions stored in the memory 506 to perform write requests for data to be written to the memory 506. The command may also include a virtual address for identifying the location in the memory 506 to which the data will be written. The memory controller 504 and/or processing element 508 stores data at a real address within the memory 506. In an embodiment, the processing element 508 maps the virtual address to a real address in the memory 506 when storing or retrieving data. As described in further detail below, the computer processor 502 provides commands to the memory 506, where the processing element 508 receives the command and fetches corresponding instructions from the memory 506. The system 500 is one example of a configuration that may be utilized to perform the processing described herein. Although the system 500 has been depicted with only a single memory 506, memory controller 504, processing element 508 and computer processor 502, it will be understood that other embodiments would also operate in other systems with two or more of the memory 506, memory controller 504, processing element 508 or computer processor 502. In an embodiment, the memory 506, memory controller 504, processing element 508 and computer processor 502 are not located within the same computer. For example, the memory 506, processing element 508 and memory controller 504 may be located in one physical location (e.g., on a memory module) while the computer processor 502 is located in another physical location (e.g., the computer processor 502 accesses the memory controller 504 and/or processing element 508 via a network). In addition, portions of the processing described herein may span one or more of the memory 506, memory controller 504, processing element 508 and computer processor 502.

FIG. 6 is a schematic diagram of an embodiment of a computer system 600 implementing active memory. In one embodiment, the computer system 600 includes an active memory device 602, an active memory device 603 and an active memory device 604. The active memory device 602 includes a memory vault 606, a memory controller 608 and a processing element 610. In an embodiment, the processing element 610, memory vault 606 and memory controller 608 are coupled and communicate via an interconnect network 612. Specifically, the processing element 610 communicates to the memory vault 606, memory controller 608 and other memory devices, such as active memory devices 603 and 604, via the interconnect network 612. The interconnect network 612 is also coupled to a main processor 624 by processor links 620 and 622. The interconnect network 612 provides a fast and high bandwidth path for communication between portions of the device, such processing elements, memory controllers and memory, to provide improved performance and reduced latency for the active memory.

The active memory device 603 includes a memory vault 626, a memory controller 628 and a processing element 630. In an embodiment, the processing element 630, memory vault 626 and memory controller 628 are all located on the same side of the interconnect network 612, such as within a single stack. By positioning the processing element 630 in the same stack as memory vault 626, the latency is reduced when accessing locations in the memory vault 626, thus further improving performance. In one embodiment, the active memory 604 includes a memory vault 614 and memory controller 616 coupled to processing element 610 and processing element 618 via the interconnect network 612. As depicted, the processing element 618 is located on the other side of the interconnect network 612 from the memory controller 616 and memory vault 614. In embodiments, the active memory devices 602, 603 and 604 include multiple layers of stacked addressable memory elements. Further, the stacked memory may be divided into memory vaults 606, 626 and 614, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 618, may be positioned on one side of the interconnect network 612 and may operate as a pool of processing elements that are available for accessing any memory in the memory system coupled to the interconnect network 612. The pooled processing elements are not limited to accessing a particular memory vault and, thus, one or more elements may be utilized upon receiving a command from the main processor 624. Accordingly, processing element 618 may be configured to access each memory vault 606, 626 and 614. In another embodiment, one or more processing element, such as processing element 630, is located as part of a stack including a memory vault 626 and memory controller 628. In such a configuration, the processing element 630 is configured to access memory vault 626 coupled to the interconnect network 612, including memory vaults 606 and 614. In one embodiment, one or more processing element, such as processing element 610, is positioned on an opposite side of the interconnect network 612 from the memory vault 606 and memory controller 608. In the configuration, the processing element 610 is configured to access any memory coupled to the interconnect network 612, including memory vaults 626 and 614.

In an embodiment, the computer system may include a plurality of active memory devices, such as the active memory devices 602, 603 and 604. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

The optimized distribution of work process may be implemented using the system and components described in FIGS. 5-6. The system has at least two distinct processor types, the main processors 624 and the processing elements 610/618. The different processor types have different characteristics that impact the performance of code that executes on them, e.g. the processing elements have higher memory bandwidth, lower latency to main memory, higher degree of multi-processing, richer set of vector instructions, and more power efficient computation compared to the main processors. On the other hand, the main processors have access to privileged operations through the operating system, support a stack and traditional calling conventions that allow for generic and recursive function calls, have data and instruction caches, and implement speculative out-of-order execution to enable faster execution times. As a result, certain code sections will exhibit better power-performance characteristics on the main processors (e.g. code with lots of memory re-use, or branches and calls), while certain other code sections will exhibit better power-performance characteristics on the processing elements (e.g. code that performs random accesses on large datasets, or streaming computation). To maximize utilization of the whole system and achieve the fastest execution, work must be judiciously divided between the different processor types. The compiler process described in FIG. 3 can optimize the distribution of work across the main processors and processing elements such that all processors in the system are optimally utilized.

Further, the system and components described in FIGS. 5-6 provide opportunities for optimization, e.g., execution time can be improved by exploiting the many more levels of parallelism available in the system (different types of processors, multiple processors of each type, slices within processing elements, vector processing, and multi-threading). However, the system also has new constraints, e.g. the power budget may not allow all processors in the system to be simultaneously active. Both these features directly impact the process of optimally distributing work, requiring sophisticated analysis in the compiler process described in FIG. 3. For instance, a code section may be scheduled for execution on a processing element even though it has better power-performance characteristics on a main processor, because the power constraints do not allow the main processor to be active at that point in the execution. Parameters associated with the power budget may be configured via the compiler and used to assess whether a code section should be executed on a main processor or a processing element. For example, a parameter of 'z' may evaluate whether, upon execution of a code section, a main processor may be active due to power constraints determined as a current state of the system. A value of True, or Yes, results in execution of the code section on the main processor, while a value of False, or No, results in execution of the code section on a processing element.

The input code targeting a single processor is transformed into parallel code that executes on multiple heterogeneous processors. To improve performance, this parallel code may exploit data-parallelism (e.g., a vector processor or a single processor with single-instruction-multiple-data (SIMD) execution capability, or multiple processors executing the same code), coarse-grained task parallelism (i.e., a main processor and multiple processors each executing different code), fine-grained task parallelism (e.g., each execution slice within a processor executing different code), as well as parallelism using assist-threads (e.g., one slice pre-fetches data for future computation). Performance may be further improved by transforming the code to expose features desirable for execution on the targeted processor (e.g., it may perform a different set of loop optimizations or change the execution schedule to use different synchronization).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, blocks, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:

dividing, by a compiler, source code into code sections;

evaluating each of the code sections based on pre-defined criteria;

characterizing each of the code sections based on results of the evaluating, the characterizing including preliminarily allocating each of the code sections to a corresponding one of a group of heterogeneous processors based on the characteristics, the group of heterogeneous processors including a main processor, a processing element, a parameterized main processor, and a parameterized processing element, wherein a determination that any of the results of the evaluating reflect no decision on allocation of one or more of the code sections to a processor causes the compiler to pass the decision on allocation to runtime code, the runtime code rendering the decision based on at least one of dynamically changing power requirements and performance considerations;

analyzing side-effects and costs of executing the code sections on preliminarily allocated processors;

transforming at least one of the code sections based on results of the analyzing to produce multiple versions of the at least one of the code sections, each of the versions having a different sequence of instructions and each of the versions optimized for a different set of performance characteristics, the optimization of the versions is a function of characteristics of each of the heterogeneous processors; and selecting one of the versions based on evaluation of parameters, and evaluation of the performance characteristics, the selected version indicated for alternate execution by the runtime code in a runtime environment;

wherein the costs evaluated include costs due to placing successive code sections on different processors, costs associated with processing element start-ups or any additional data transfers required as a result of executing the code sections on the allocated processors.

2. The method of claim 1, wherein the dividing the code into the code sections is implemented by at least one of:
   direct user input received at the compiler;
   a program structure of the source code;
   code semantics;
   data dependencies;
   code size; and
   profiling data.

3. The method of claim 2, wherein elements of the program structure used in dividing the source code include at least one of:
   program functions;
   loops;
   basic blocks; and
   call graph connected components.

4. The method of claim 1, wherein the pre-defined criteria include at least one of:
   number of compute operations;
   memory access patterns;
   amount of bandwidth required to execute the code sections;
   function calls;
   branches;
   size of the code sections;
   profiling data;
   user input;
   vector parallelism;
   fine-grain parallelism; and
   synchronization requirements.

5. The method of claim 1, wherein the transforming the code sections includes producing an execution scheme for the code sections, the execution scheme identifying at least one of:
   at least one of the code sections assigned for execution in parallel with at least one other of the code sections;
   at least one of the code sections assigned for execution on the main processor;
   at least one of the code sections assigned for execution on the processing element; and
   at least one of the code sections predicated on a parameter.

6. The method of claim 1, wherein a code section characterized as allocated to the parameterized main processor results in execution of the code section on the main processor when a compiler-determined parameter evaluates to true at runtime.

7. The method of claim 1, wherein a code section characterized as allocated to the parameterized processing element results in execution of the code section on the processing element when a compiler-determined parameter evaluates to true at runtime.

8. The method of claim 1, wherein the code sections characterized as indeterminate by the compiler indicate that a processor type for executing the code sections is determined by a runtime system using dynamic information on current system state and performance feedback, wherein processor types include the main processor and the processing element.

9. The method of claim 1, wherein the side-effects evaluated include effects of concurrent execution of the code sections on at least one of a plurality of main processors and at least one of a plurality of processing elements in terms of at least one of resource availability, maximum power constraints, data layout, and synchronization optimization.

10. A computer program product comprising a non-transitory storage memory embodied with computer program instructions, which when executed by a computer processor causes the computer processor to implement a method, the method comprising:
    dividing source code into code sections;
    evaluating each of the code sections based on pre-defined criteria;
    characterizing each of the code sections based on results of the evaluating, the characterizing including preliminarily allocating each of the code sections to a corresponding one of a group of heterogeneous processors including a main processor, a processing element, a parameterized main processor, and a parameterized processing element, wherein a determination that any of the results of the evaluating reflect no decision on allocation of one or more of the code sections to a processor causes the compiler to pass the decision on allocation to runtime code, the runtime code rendering the decision based on at least one of dynamically changing power requirements and performance considerations;
    analyzing side-effects and costs of executing the code sections on preliminarily allocated processors;
    transforming at least one of the code sections based on results of the analyzing to produce multiple versions of the at least one of the code sections, each of the versions having a different sequence of instructions and each of the versions optimized for a different set of performance characteristics, the optimization of the versions is a function of characteristics of each of the heterogeneous processors; and
    selecting one of the versions based on evaluation of parameters, and evaluation of the performance characteristics, the selected version indicated for alternate execution by the runtime code in a runtime environment;
    wherein the costs evaluated include costs due to placing successive code sections on different processors, costs associated with processing element start-ups or any additional data transfers required as a result of executing the code sections on the allocated processors.

11. The computer program product of claim 10, wherein the dividing the code into the code sections is implemented by at least one of:
    direct user input received at a compiler;
    a program structure of the source code;
    code semantics;
    data dependencies;
    code size; and
    profiling data.

12. The computer program product of claim 11, wherein elements of the program structure used in dividing the source code include at least one of:
    program functions;
    loops;
    basic blocks; and
    call graph connected components.

13. The computer program product of claim 10, wherein the pre-defined criteria include at least one of:
    number of compute operations;
    memory access patterns;
    amount of bandwidth required to execute the code sections;
    function calls;
    branches;
    size of the code sections;
    profiling data;
    user input;
    vector parallelism;

fine-grain parallelism; and
synchronization requirements.

14. The computer program product of claim 10, wherein the transforming the code sections includes producing an execution scheme for the code sections, the execution scheme identifying at least one of:
   at least one of the code sections assigned for execution in parallel with at least one other of the code sections;
   at least one of the code sections assigned for execution on the main processor;
   at least one of the code sections assigned for execution on the processing element; and
   at least one of the code sections predicated on a parameter.

15. The computer program product of claim 10, wherein a code section characterized as allocated to the parameterized main processor results in execution of the code section on the main processor when a compiler-determined parameter evaluates to true at runtime.

16. The computer program product of claim 10, wherein a code section characterized as allocated to the parameterized processing element results in execution of the code section on the processing element when a compiler-determined parameter evaluates to true at runtime.

17. The computer program product of claim 10, wherein the code sections characterized as indeterminate by a compiler indicate that a processor type for executing the code sections is determined by a runtime system using dynamic information on current system state and performance feedback, wherein processor types include the main processor and the processing element.

18. The computer program product of claim 10, wherein the side-effects evaluated include effects of concurrent execution of the code sections on at least one of a plurality of main processors and at least one of a plurality of processing elements in terms of at least one of resource availability, maximum power constraints, data layout, and synchronization optimization.

19. A method, comprising:
   dividing, by a compiler, source code into code sections;
   characterizing each of the code sections based on pre-defined criteria, each of the code sections characterized as at least one of: allocate to a main processor, allocate to a processing element, allocate to one of a parameterized main processor and a parameterized processing element, and indeterminate, wherein a parameter used in the characterizing includes a constraint imposed by a power budget for an active memory system;
   analyzing side-effects and costs of executing the code sections on allocated processors, the side-effects including the constraint;
   transforming at least one of the code sections based on results of the analyzing to produce multiple versions of the at least one of the code sections, each of the versions having a different sequence of instructions and each of the versions optimized for a different set of performance characteristics, the optimization of the versions is a function of characteristics of each of the heterogeneous processors; and
   selecting one of the versions based on evaluation of parameters, and evaluation of the performance characteristics, the selected version indicated for alternate execution in a runtime environment;
   wherein the costs evaluated include costs due to placing successive code sections on different processors, costs associated with processing element start-ups or any additional data transfers required as a result of executing the code sections on the allocated processors.

20. The method of claim 19, wherein the pre-defined criteria includes fine-grained task parallelism, and the re-characterizing the code sections for alternate execution includes allocating the code sections among a plurality of execution slices in at least one of the processing elements.

21. A computer program product comprising a non-transitory storage medium embodied with computer program instructions, which when executed by a computer processor causes the computer processor to implement a method, the method comprising:
   dividing source code into code sections;
   characterizing each of the code sections based on pre-defined criteria, each of the code sections characterized as at least one of: allocate to a main processor, allocate to a processing element, allocate to one of a parameterized main processor and a parameterized processing element, and indeterminate, wherein a parameter used in the characterizing includes a constraint imposed by a power budget for an active memory system;
   analyzing side-effects and costs of executing the code sections on allocated processors, the side-effects including the constraint;
   transforming at least one of the code sections based on results of the analyzing to produce multiple versions of the at least one of the code sections, each of the versions having a different sequence of instructions and each of the versions optimized for a different set of performance characteristics, the optimization of the versions is a function of characteristics of each of the heterogeneous processors; and
   selecting one of the versions based on evaluation of parameters, and evaluation of the performance characteristics, the selected version indicated for alternate execution in a runtime environment;
   wherein the costs evaluated include costs due to placing successive code sections on different processors, costs associated with processing element start-ups or any additional data transfers required as a result of executing the code sections on the allocated processors.

22. The computer program product of claim 21, wherein the pre-defined criteria includes fine-grained task parallelism, and the re-characterizing the code sections for alternate execution includes allocating the code sections among a plurality of execution slices in at least one of the processing elements.

* * * * *